United States Patent
Gell, Jr.

[11] Patent Number: 5,159,366
[45] Date of Patent: Oct. 27, 1992

[54] UNDERWATER HOUSING AND PRESSURE COMPENSATION METHOD AND APPARATUS

[75] Inventor: Harold A. Gell, Jr., Silver Spring, Md.

[73] Assignee: Sea Fathoms Industries, Inc., Silver Spring, Md.

[21] Appl. No.: 565,723

[22] Filed: Aug. 13, 1990

Related U.S. Application Data

[63] Continuation-in-part of Ser. No. 491,094, Mar. 9, 1990, Pat. No. 4,980,707, and Ser. No. 501,913, Mar. 30, 1990, Pat. No. 4,947,783.

[51] Int. Cl.⁵ ............................................. G03B 17/08
[52] U.S. Cl. ........................................ 354/64; 206/811
[58] Field of Search ........................... 354/64; 206/811

[56] References Cited

U.S. PATENT DOCUMENTS

| | | | |
|---|---|---|---|
| 1,131,712 | 3/1915 | Klein | 114/312 |
| 2,537,303 | 1/1951 | Cobb, Jr. et al. | 354/64 |
| 2,973,131 | 2/1961 | Mead et al. | 299/66 |
| 3,036,506 | 5/1962 | Andresen, Jr. | 354/64 |
| 3,042,796 | 7/1962 | de Forest | 206/811 X |
| 3,162,107 | 12/1964 | Byers | 354/64 |
| 3,717,078 | 2/1973 | Ogura | 95/11 |
| 3,759,605 | 9/1973 | Johnson | 350/179 |
| 4,033,392 | 7/1977 | Less | 354/64 X |
| 4,041,507 | 8/1977 | Ko et al. | 354/64 |
| 4,113,137 | 9/1978 | Wind | 220/319 |
| 4,155,453 | 5/1979 | Ono | 206/811 X |
| 4,176,701 | 12/1979 | Welgan | 354/64 X |
| 4,281,343 | 7/1981 | Monteiro | 358/99 |
| 4,766,451 | 8/1988 | Fujimura et al. | 354/64 |
| 4,771,299 | 9/1988 | Gell, Jr. | 354/64 |
| 4,771,320 | 9/1988 | Gell | 354/64 |
| 4,853,722 | 8/1989 | Gell, Jr. | 354/64 |
| 4,947,783 | 8/1990 | Gell, Jr. | 354/64 X |

FOREIGN PATENT DOCUMENTS

| | | | |
|---|---|---|---|
| 2926224 | 1/1980 | Fed. Rep. of Germany | 354/64 |
| 1043770 | 6/1952 | France | 354/64 |

Primary Examiner—Michael L. Gellner
Attorney, Agent, or Firm—Harold Gell

[57] ABSTRACT

A method and apparatus for protecting a camera or other apparatus from a water environment with a flexible, pressure compensated bag-like housing which is maintained at a slight positive pressure. The housing is larger than its contents to permit the contents to be moved relative to at least one wall to activate controls by frictional engagement between the wall and control during the relative movement. The housing may be configured as a merchandising container for the contents.

37 Claims, 4 Drawing Sheets

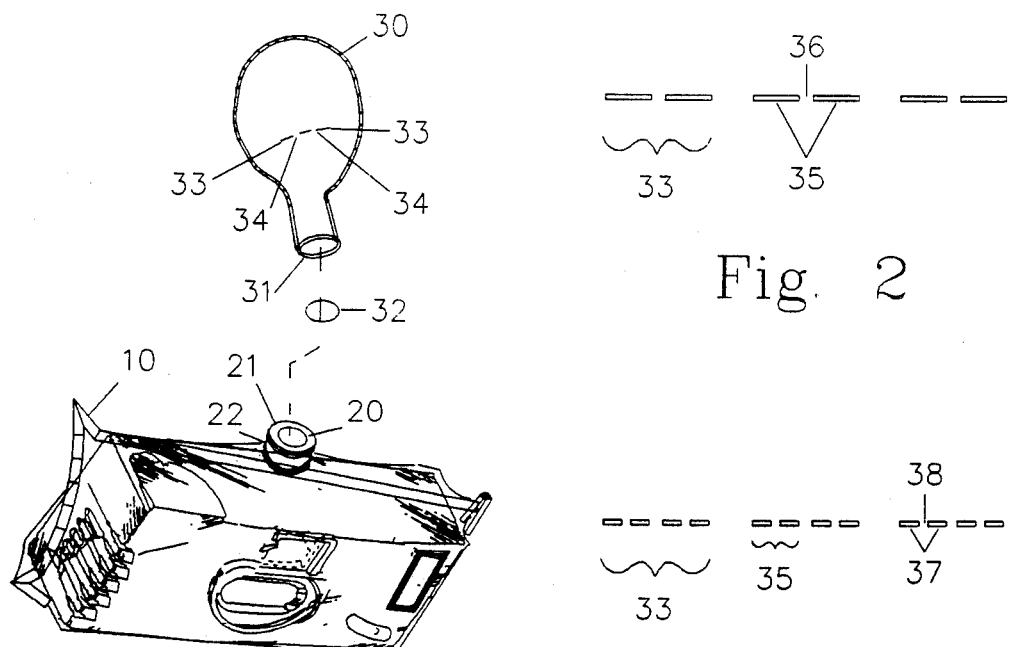
Fig. 1
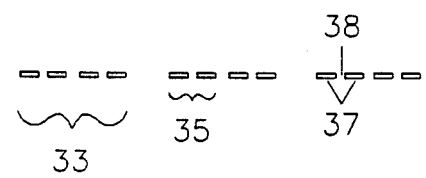
Fig. 2
Fig. 3
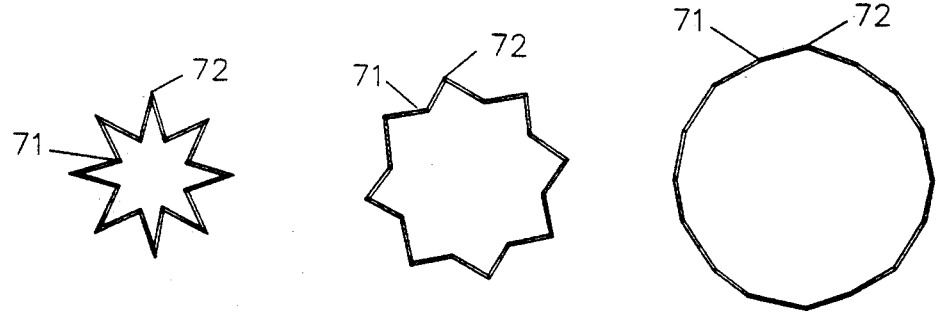
Fig. 7    Fig. 8    Fig. 9

UNDERWATER HOUSING AND PRESSURE COMPENSATION METHOD AND APPARATUS

RELATED APPLICATIONS AND PATENTS

This is a continuation in part of U.S. patent application Ser. No. 07/491,094 filed Mar. 9, 1990 for "Pressure Compensation Method And Apparatus For Underwater Equipment", U.S. Pat. No. 4,980,707 and U.S. patent Application Ser. No. 07/501,913 filed Mar. 30, 1990 for "Pressure Compensation Method And Apparatus For Underwater Equipment" and issued Aug. 14, 1990 as U.S. Pat. No. 4,947,783.

FIELD OF THE INVENTION

The present invention relates a pressure compensate underwater housing which is maintained at a slight positive pressure while its contents are moved relative to a housing wall to activate controls by frictional engagement between the control and wall.

This is related to U.S. patent application Ser. No. 07/113,913 filed Oct. 29, 1987 for "Method And Apparatus For Underwater Operation Of Non-Waterproof Equipment" and issued Sep. 13, 1988 as U.S. Pat. No. 4,771,299; U.S. patent application Ser. No. 07/085,336 filed Aug. 14, 1987 for "Method And Apparatus For Extending The Depth Range Of Underwater Equipment" and issued Sep. 13, 1988 as U.S. Pat. No. 4,771,320; U.S. patent application Ser. No. 07/243,596 filed Sep. 12, 1988 for "Method And Apparatus For Extending The Depth Range Of Underwater Equipment" and issued Aug. 1, 1989 as U.S. Pat. No. 4,853,722; and U.S. patent application Ser. No. 07/491,094 filed Mar. 9, 1990 for "Pressure Compensation Method And Apparatus For Underwater Equipment", and which are hereby incorporated in this application by reference.

BACKGROUND OF THE INVENTION

The co-pending U.S. patent applications and related U.S. Patents listed in the "Related Applications and Patents" section of this specification present the current trend in inexpensive underwater housings. However this technology has failed to completely meet the needs of the sport diving industry for an inexpensive, single use camera combined with an integral flash or permit its use with the current influx of single use cameras and cameras without power winding means short of the costly and failure prone method comprised of a rotating shaft and water-proof bushing.

OBJECTIVES OF THE INVENTION

It is a primary objective of the present invention to provide an inexpensive, lightweight, underwater housing which allows operation of rotating controls through the housing wall without power means or a rotating shaft and water-proof bushing.

Another primary objective of the present invention is to provide a single-use underwater housing incorporating a pressure compensating means which enables manipulation of the object within the housing relative to at least one housing wall so that a rotatable control may be activated by the relative movement of the object within the housing and the housing wall.

Another objective of the invention is to provide an underwater housing fabricated from an inexpensive flexible material which may be pressure sealed by rotating an open end of the housing about an axis created by a means which may be used to prevent unrolling of the sealed end.

Another objective of the invention is to provide a lightweight, pressure compensated water-proof housing which is maintained at a slight positive pressure to permit the relative movement between the housing and its contents for operating rotational controls through the housing walls by frictional engagement between the control and housing during the periods of relative movement.

Another objective of the invention is to provide an underwater housing fabricated from an inexpensive flexible material which may be pressure sealed by rotating an open end of the housing about an axis to create a lightweight, pressure compensated water-proof housing which is maintained at a slight positive pressure to permit the relative movement between the housing and its contents for operating rotational controls through the housing walls by frictional engagement between the control and housing during the periods of relative movement.

Another objective of the invention is to provide a merchandising container for a camera which also serves as a lightweight, pressure compensated water-proof housing which is maintained at a slight positive pressure to permit the relative movement between the housing and its contents for operating controls through the housing walls by frictional engagement between the control and housing during the periods of relative movement.

An objective of the present invention is to provide a means whereby a balloon may be inflated with a predetermined volume of air or gas so that when it is pneumatically attached to an underwater housing it will provide the approximate amount of gas required to pressure compensate the underwater housing to the expected maximum ambient water pressure.

Another objective of the present invention is to provide indicia on a balloon which changes as the balloon stretches to indicate the volume of gas contained and to provide an indication of the operational depth limits of a pressure compensation system using the balloon as a gas source.

Another objective of the present invention is to provide a balloon for supplying pressure compensating gas to an underwater device wherein the balloon changes shape as a function of the amount of air or gas forced into the balloon and the changes are an indication of the operational depth limits of the system based on the gas within said balloon.

Another objective of the present invention is to provide a means whereby an inflated balloon bearing a volume responsive indicia may be pneumatically attached to an underwater housing to provide a source of pressure compensating gas to equalize the pressure within the underwater housing to a depth indicted by the idicia.

Another objective of the present invention is to provide a method for pressure compensating an underwater device to extend its operational depth limits.

SUMMARY OF THE INVENTION

A flexible bag of transparent material or translucent or opaque material including at least one optical window is provided as a waterproof container for underwater equipment such as a single-use camera. A pressure compensation means provides a gas source which is used to maintain the pressure within the housing approximately equal to the ambient water pressure and slightly positive when rotational controls of the camera are to be used for film winding etc. The slight positive pressure and compensation source permits easy flexing of the bag and expulsion of surplus air therein so that a single-use camera or other device within the bag may be moved relative to at least one wall of the bag so that a control such as a wheel or alide may be turned through the wall of the bag by the relative movement of the object within the bag and the bag wall. In one embodiment, the mouth of a balloon blown to a predetermined volume is sealed to an opening in the bag to provide a pressure compensation means.

In an alternate embodiment, a compensation source is coupled to the bag via a flexible tube which is introduced into the bag via the normal bag opening before the opening is rolled to seal the opening. Alternately, a barb connector may be used to couple the tubing to the bag. In a further embodiment of the invention, a single-use camera is packaged in a moisture-proof barrier which is adapted to be used as a pressure compensated underwater housing.

DESCRIPTION OF THE DRAWINGS

FIG. 1 illustrates an exploded view of the components comprising the invention.

FIG. 2 illustrates a depth indicating bar indicia as it appears for an intermediate depth range.

FIG. 3 illustrates an exemplary depth indicated bar indicia as it appears at a maximum depth indicating range.

FIG. 7 is a cross-section of an alternate embodiment of the invention taken along line 1—1 of FIG. 1 where the external configuration of the balloon serves as an indicator.

FIG. 8 illustrates a cross-section of an alternate embodiment of the invention taken along line 1—1 of FIG. 1 where the external configuration of the balloon serves as an indicator.

FIG. 9 is a cross-section of an alternate embodiment of the invention taken along line 1—1 of FIG. 1 where the external configuration of the balloon serves as an indicator.

DESCRIPTION OF THE INVENTION

Figure 4:
FIG. 4 illustrates a preferred embodiment of the invention where a depth indicating range is incorporated in a logo printed on the balloon and the balloon is blown up to the point where the logo is stretched to indicate a first depth limit.

In FIG. 1, the waterproof housing 10 for an underwater camera includes a walled structure such as an open ended spool 20. The spool 20 is provided with a flange on each end. One flange 22 is sealed to the housing 10 and the other 21, provides a means to hold the mouth 31 of the balloon 30 in place. If desired, a rubber band 32 or other clamping means may be used to increase the security of the balloon/tube seal. The relative sizes of the balloon and camera case are selected so that the capacity of the balloon will be sufficient for contemplated operations. The relative sizes of the tube, bead and balloon mouth are selected to allow the balloon mouth to stretch over the bead and form a gas tight seal about the tube.

To ensure that the balloon 30 contains the proper amount of gas to allow camera operation to the desired depths, an indicia comprised of a plurality of bars 33 spaced apart by a distance 34 are provided on the outer surface of the balloon 30. In the embodiment illustrated in FIG. 1, the space 34 between the bars 33 is such that when the balloon is completely deflated, the space is not visible. When the balloon is blown up to a point where the air within the balloon is sufficient to allow the camera to be operational to a depth of 30 feet, the space 34 between the bars 33 becomes apparent and the operator clearly sees three bars, indicating the device is operational to 30 feet.

The bars 33 may be segmented as illustrated in FIG. 2. In FIG. 2, each bar 33 is comprised of two sub bars 35 separated by a space 36 that does not become apparent until the indicia has stretched by air being forced into the balloon to equal a volume which will allow the system to be operational to a depth of 60 feet. Thus the operator sees a total of six bars indicating an operational depth of 66 feet.

Each of the sub bars 35 of FIG. 2 may be further divided into two bars, 37 as illustrated in FIG. 3 separated by a space 38. The space 38 is dimensioned such that it does not become apparent until the balloon is blown up with a sufficient quantity of air to allow the system to be operational to a depth of 120 feet. Thus when the balloon is blown to this extent, the indicia stretches and the user can clearly see a total of 12 bars, indicating an operational depth of 120 feet.

Figure 5:
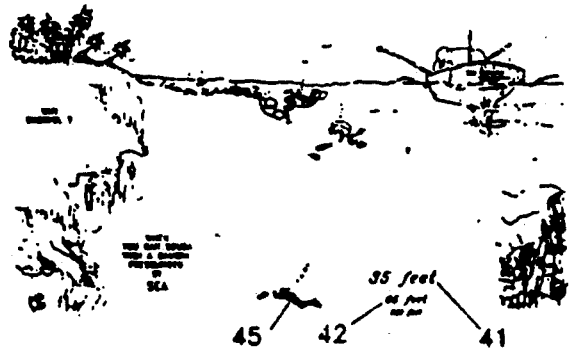
FIG. 5 illustrates a preferred embodiment of the invention where a depth indicating range is incorporated in a logo printed on the balloon and the balloon is blown up to the point where the logo is stretched to indicate a second depth limit.

In a preferred embodiment of the invention, the bars and spaces illustrated in FIGS. 1 through 3 are replaced by legible indicia within a logo identifying the balloon as a pressure compensation source. For instance, in FIG. 4 depth limiting indicia 41 is included in the logo in a size and configuration which will not become legible until the balloon is blown up with a volume of air that will provide operational compensating air to the indicated depth. In FIG. 4 that indicia spells out "35 feet". Thus when the operator desires to use the system to a depth no greater than 35 feet, he simply blows up the balloon until he can read 35 feet. The balloon is then connected to the waterproof housing. If a deeper depth is desired, the operator continues to blow up the balloon until the indicia appears as illustrated in FIG. 5 where depth indicia 41 and 42 are both visible, indicating that the system will now operate as deep as 65 feet. If it is anticipated that even deeper depths are required, the operator continues to blow up the balloon until all three indicia, 41, 42, and 43 are visible indicating a maximum depth of 100 feet as illustrated in FIG. 6.

Figure 6:
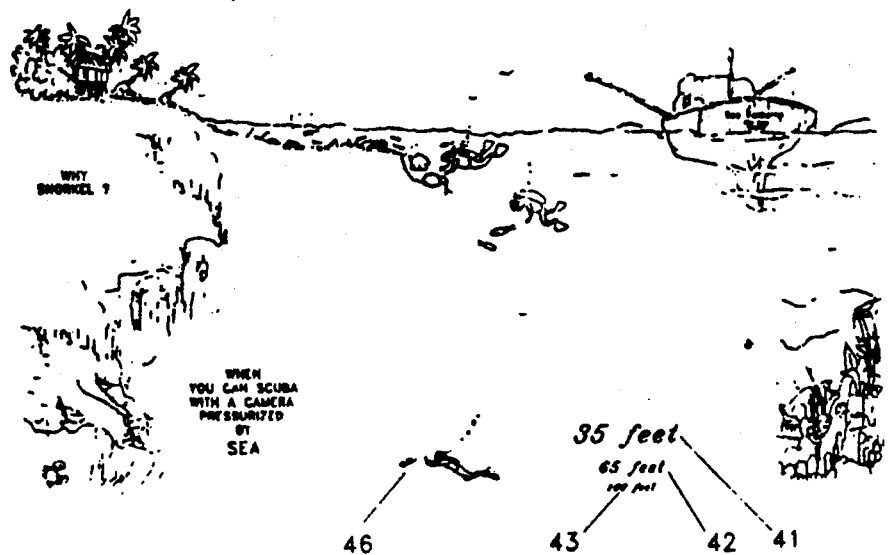
FIG. 6 illustrates a preferred embodiment of the invention where a depth indicating range is incorporated in a logo printed on the balloon and the balloon is blown up to the point where the logo is stretched to indicate a first, second and third depth limit.

In an alternate embodiment of the invention, the logo of FIGS. 4 through 6 may contain a design such as 44 of FIG. 4. The design is printed in a compressed form so that it is not clearly discernible until the container (balloon) stretches do to the addition of a predetermined volume of air calculated to allow operations to an indicated depth. This second condition is indicated by the increased size of the image in FIG. 5 where it is clear that the design contains a diver 45. As the image increases in size do to the further addition of air in FIG. 6, it becomes evident that the design contains two fish 46. This and the other techniques suggested herein may be designed to provide any degree of scale refinement desired. For instance, the design could contain two elements to provide a three step range as illustrated or it could contain a hundred elements to provide a hundred step range.

If printed indicia are not practical or desirable for indicating the operational depth limit of the system, the indicia may be provided by forming the balloon so that its external geometry changes as more air is forced into it. For instance, the balloon may include a plurality of pleats which will provide a tactile indicia. In this situation, when the balloon is partially inflated, the pleats around the balloon will be clearly visible and easily felt as indicated by FIG. 7 which is a cross section of the balloon. It illustrates how the balloon would appear when partially inflated to provide air for operations to a shallow depth. Note that the grooves or depressions 71 around the circumference of the balloon are deep to provide a clear distinction from the configuration illustrated in FIG. 8 where the grooves have become shallower and the points 72 spaced farther apart to give an indication that the system may be used at a deeper depth, such as 60 feet. In FIG. 9, the cross section of the balloon becomes spherical due to the volume of air forced into it and the grooves 71 and 72 are no longer easily distinguishable, indicating that the balloon now contains enough air to allow system operations to a depth of 120 feet.

The method of using the invention includes the steps of blowing up the balloon to a volume sufficient to provide the gas or air needed for pressure compensation at the anticipated operational depth as indicated by one of the indicia system previously described. The volume of gas is calculated according to Boyle's Law to be equal to the gas volume within the underwater housing at a first ambient pressure for operations at an increased pressure of one atmosphere. In other words, if the operational depth is to be around 33 feet or 10 meters, the balloon is blown up with a gas volume equal to the gas volume of the housing and the indicia is designed to provide the proper indication. If the depth is two atmospheres greater than sea level or 66 feet (20 meters), the volume of the gas should be equal to two times the volume of the housing and for 99 feet or 30 meters, three times the housing volume.

This pressure/volume relationship may be used in a reverse manner to approximate the size of the lettering or spaces in the visual indicia on the balloon. For instance, if the lettering 41 of FIG. 6 is dimensioned so that it is just clearly visible when the balloon is inflated but the latex of the balloon has not stretched, and the volume of the balloon in this condition equals the volume of the housing to be protected, then the indicia can be approximately 33 feet plus an additional depth which is within the range of the uncompensated housing.

Because the balloon is a sphere, the size variation of the lettering of the indicia or the dimensions of the space between the indicia bars is not a linear function with respect to volume. For instance, assume the waterproof housing has a volume of 170 cubic centimeters, and the housing can function without compensation at a nominal depth of 10 feet. In this scenario, the volume of the balloon would have to be 130 cubic centimeters to allow an operational depth of approximately 35 feet. This requires that the balloon be blown up to approximately $2\frac{1}{2}$ inches in diameter. This would provide a circumference of 7.8 inches around which the indicia may be printed. If the indicia is printed so that it is legible at this size, it may be used to indicate a depth of 35 feet. If the system to be used to a depth of 65 feet, the diameter of the balloon must be approximately $3\frac{1}{4}$ inches to provide enough compensating air to completely equalize the pressure at a depth within 10 feet of the desired 65 foot mark. The circumference of the $3\frac{1}{4}$ inch diameter balloon is approximately 10.2 inches so the indicia indicating the 65 foot depth must be printed large enough to be visible when the surface of the balloon is stretched from 7.8 inches to 10.2 inches in circumference but invisible when the circumference is only 7.8 inches. If the system is to be submerged to a depth of 100 feet, the diameter of the balloon must be approximately $3\frac{3}{4}$ inches and this extends the circumference of the balloon from 10.2 inches to 11.8 inches. Thus the 100 foot indicia must be large enough to be visibly significant when the surface of the balloon is stretched to 11.8 inches in circumference but invisible when stretched to 10.2 inches.

When the balloon is properly inflated, its mouth is stretched over the bead around the top of the tube and allowed to seal without losing gas during the operation. A clamp may be placed around the balloon neck and tube to improve the seal and balloon retention.

Figure 10:
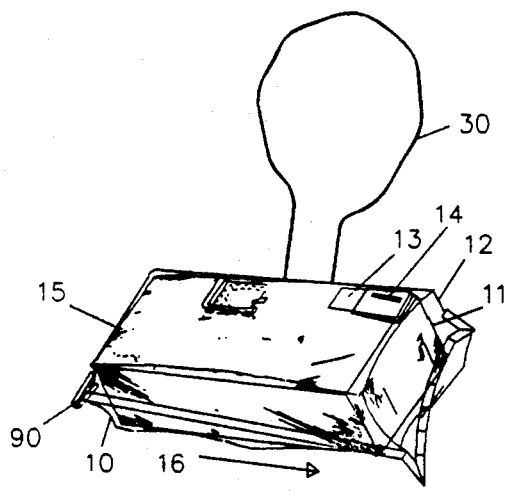
FIG. 10 is a rear view of a simplified version of the invention illustrating the relation of key features in a camera/bag interface.

In all versions of this invention, the housing, 10 of FIG. 10, or at least a wall adjacent to a rotating or slide control 14 is longer than the side of the object 11 supporting the control within the housing along an axis in line with the activation direction of the control device to be manipulated. The differential resilience between the housing and air compensation source 30 and their relative positioning relative to the water surface cause the housing wall to stand off of the object, camera body in the exemplary system, in a softly inflated posture which allows the housing wall to be held against the film advance wheel so that the wheel may be rotated by sliding the wall back and forth while alternately pressing the wall against the wheel to wind the film.

In FIG. 10 the housing or bag 10 is slightly larger than the camera 11. This causes a space 12 to form when the bag is at a slight positive pressure. With the housing 10 in this condition, the bag wall and reinforcing pad 13 may be held in frictional engagement with the film winding wheel 14 by a small force such as may be exerted by holding the camera between the fingers of one hand. The camera and sealed end 15 of the bag is forced in the direction of arrow 16 toward the space 12 at the other end of the bag. This causes the wheel 14 to rotate due to its frictional engagement with the wall and pad 13 which are moving relative to the camera. This motion of the camera and bag is not inhibited because the gas in the bag escapes into the pressure compensation means 30 as the bag is collapsed. If a compensation means were not present to act as a buffer, the pushing action of the bag end 15 and camera would increase the pressure within the bag and prohibit the frictional engagement between the wheel 14 and bag wall and the control would not be rotated. The pressure holding the pad 13 and bag wall against the wheel 14 is released when the camera has been moved into space 12. The camera is then moved back to the illustrated position at end 15 to recreate space 12. During this action, gas flows back into the bag to keep external pressure from inhibiting the relative movement between camera and bag. Once the camera has been moved back to the illustrated position, the synchronous sequence can be repeated to turn control 14 another increment. In some applications, control 14 may be a slide means which ratchets a film winding means and cocks a shutter.

Figure 11:
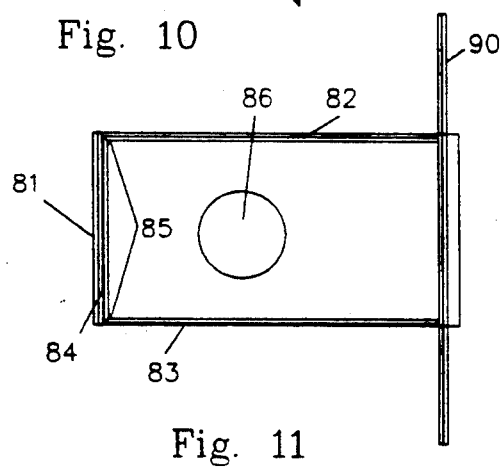
FIG. 11 is a front view of a bag waterproof container constructed in accordance with the present invention.

In a preferred embodiment, the housing 10 of FIGS. 1 and 10 is a bag fabricated from a plastic film material such as vinyl or polyethylene of a thickness within the range of 1 to 20 mils. Any thin flexible material may be used but the invention is best practiced by constructing the bag from a tubular extruded polyethylene of high clarity and approximately 2½ mils thickness. After extrusion, the bag is flattened and heat sealed at one end, 81 of FIG. 11. To ensure continuity of the structure and the air tightness of the final product, heat seals 82 and 83 are created in the top and bottom of the bag and connected to a second heat seal 84 in a manner which causes a radius 85 to be formed at the interior intersection of the heat seals. The radius prevents undue stress which may cause tearing. The folded tube walls and seals 82 and 83 create double seals at the top and bottom which complement the double seal created by seals 81 and 84 to insure a pressure resistant structure.

If the invention is practiced without using a high clarity plastic as the flexible bag material, an optical window 86 is placed on the bag so that any camera within the bag can image the outside world. Additional windows may be provided on the bag for a flash, view finder and film count register.

Figure 12:
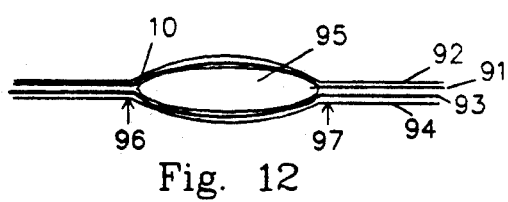
FIG. 12 is an end view of the waterproof bag container illustrating laminated structure of the sealing means.

A sealing means 90 is secured adjacent to the open end of the bag. It includes a means whereby an axis may be created adjacent to the open end so that the bag may be rolled about the axis to form a roll seal for the open end. The means for creating the axis may be tabs at the edges of the bag. The tabs are held relatively immobile while the bag is rolled or wrapped around the axis therebetween. FIG. 12 more clearly illustrates the construction of a preferred sealing means. It is comprised of a malleable wire 91 held to one side of the bag by a flexible strip such as ¼" wide plastic adhesive strip 92. A similar structure including a malleable wire 93 and a flexible securing strip 94 is positioned on the opposite side of the bag 10. The system is sealed by sliding an object such as a camera into the opening 95 of the bag and grasping the tab extensions of sealing strips 91 through 94 adjacent to the edges of the plastic bag 10 between the thumb and forefingers of both hands at 96 and 97. The bag is then twirled about the axis created between the operators hands along the tape adjacent to the open bag end. The weight of the camera and twirling action create a force which causes the flexible material of the bag to roll into a tight seal that may be locked to render it pressure resistant by preventing the bag from unrolling. Locking the seal to render it pressure resistant is accomplished by securing the ends of the bag together at the twirling axis so the unrolling force forces the securing means into the bag adjacent to the roll seal and prevents relative rotational movement between the bag material along the roll seal axis and the bag.

Figure 13:
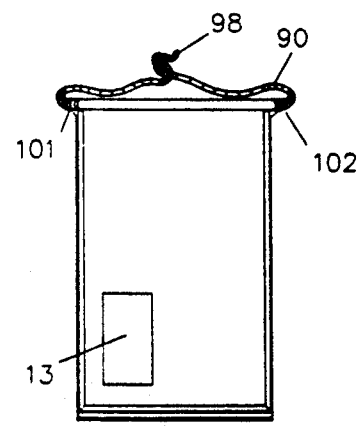
FIG. 13 is a rear view of the waterproof bag of the subject invention illustrating the tied sealing means and reinforcing patch over a control area.
Figure 14:
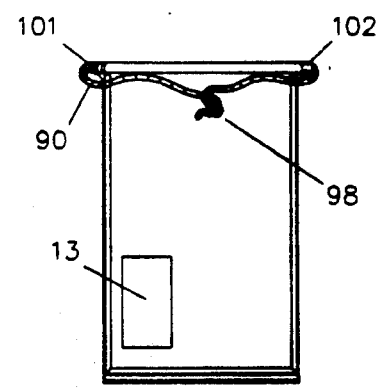
FIG. 14 is a rear view of the waterproof bag of the subject invention illustrating the tied sealing means in the partially unrolled locked position.

Twirling stops after a few revolutions due to the bag being rolled tightly down against the camera within the bag. The ends of the sealing means 90 are folded over and twisted together to lock the seal as illustrated at 98 in FIG. 13. This must be accomplished without pulling the ends 101 and 102 toward the center, thus the sealing means 90 must be more than twice as long as the bag is wide. Sealing means 90 is folded back across the bag and the overlapping portion of the wires are twisted tightly without drawing the bag edges 101 and 102 together. The wires are released and because the ends are not drawn tightly together when twisted, the rolled bag seal unrolls slightly as illustrated by FIG. 14. This is a critical requirement because it locks the seal and creates the small space 12 within the bag illustrated in FIG. 10 which permits the camera to be moved relative to the length of the bag while it is sealed within. This motion allows the manual film advance means 14 to be operated through the wall of the bag.

A 3 to 20 mil vinyl or polypropylene flexible tape is secured to the bag to form a reinforcing pad 13 overlying the film advanced wheel 14 to prevent the teeth of the ratchet from perforating the bag wall.

A sealing means similar to 90 but comprising shorter, ineffective tab ends is presented in U.S. Pat. No. 2,973,131 for "Bag for Sampling Milk and The Like", issued to H. Mead, et al on Feb. 28, 1961. That device proved to be inoperative in the underwater environment. It was not designed or intended to be a pressure vessel and pressure within the bag caused the seal to unroll and leak, especially during ratchet manipulation when the bag is subjected to repetitive squeezing. A tab structure similar to the short tabs of the Mead et al device may be used in the present invention by securing the tabs to the bag sides with a waterproof adhesive or tape.

Figure 15:
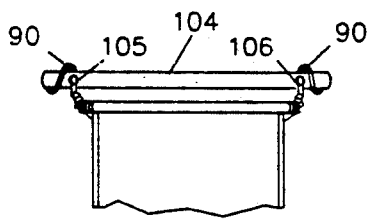
FIG. 15 illustrates a semi-rigid stick means for securing and locking the sealing means after the edge of the bag has been rolled up.

In an alternate embodiment, FIG. 15, a member such as a plastic or wooden stick 104 slightly longer than the width of the bag 10 is provided with holes 105 and 106 which are positioned at a distance approximately equal to the width of the bag. The ends of the sealing means 90 are inserted through the holes after the bag has been twirled or twisted around the sealing means and the wires are then wrapped around the ends of the stick 104. This permits a shorter wire to be used on the bag and ensures that the corners of the rolled up end of the bag are not drawn together by over tightening of the wires when they are twisted together as in the earlier embodiment illustrated in FIG. 14. A similar result may be reached by using a small diameter stick without holes and simply wrapping the wire ends around the stick, but this does not provide as much security as the illustrated holed version.

Further embodiments are contemplated where the roll seal axis is created by a stick like means or tape in place of the wire. In each case, the primary function is the creation of an axis along the edge of the bag opening about which the bag may be rolled to create a roll seal and a means to prevent relative rotational movement between the bag and that portion of the bag lying along the roll seal axis after the seal is created. For instance, the purposes of this invention may be served by simple tabs extending from the sides of the bag near the opening. The tabs may be extensions of the material forming the bag or a means secured to the bag and the axis may be created within the bag material by the act of holding the tabs and twirling the bag about a line joining the tabs. When the roll seal is created, it is converted to a pressure seal by securing the tabs to the bag to prevent relative rotation between the bag material along the center of the roll seal axis and the bag material outside of the roll seal. This may be accomplished with adhesive means or mechanical means.

A pressure compensation means such as a balloon 30 of FIG. 1 is connected to the bag by an adapter as previously described. This enables the light flexible housing to be used to protect a camera at any reasonable sport diving depth through the principles of pressure compensation as more fully explained in the referenced related applications and patents. For the added purposes of this invention, the compensation means acts as a reservoir or buffer that regulates the pressure within the bag so that the camera within may easily be slid back and forth within the space of the bag while the reinforced section 13 of the bag is alternately held and released against the film advance ratchet wheel 14 of the camera. Thus the film may be wound within the camera with a simple back and forth movement of the bag relative to the camera back synchronized with alternate pressure and release of the ratchet through the reinforced area. This eliminates the need for an external winding means protruding through the housing to simplify construction, reduce cost and increase reliability.

Figure 16:
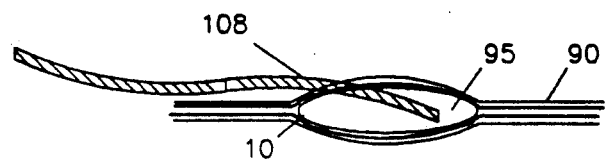
FIG. 16 illustrates the open end of the waterproof bag and the introduction of a pressure compensating tubing means.

A pressure compensation means may be connected to the bag by a tube 108 which is introduced into the open mouth 95 of the bag 10 before the bag is twirled around the sealing means 90 as illustrated in FIG. 16. The plastic tube 108 is held between the thumb and forefinger along with the sealing means 90 at one edge of the bag while the bag edge is twirled or rolled up. Security of the tube within the bag may be enhanced by using a stick securing means 104 to prevent the bag from unrolling and threading the plastic tube through hole 105 or 106 to create a binding condition which will resist the withdrawal of the tube from the bag after the end of the bag is rolled and the wires are wrapped around the ends of the stick as illustrated in FIG. 15.

In an alternate version of the invention, the moisture proof barrier or packaging used to encase a single-use camera preloaded with film and including a manual film advance means such as the Kodak Fun Saver may function as the flexible bag or housing 10. In this embodiment, the merchandising protective container, the retail package of the camera, is sealed to form a water proof pressure housing. As in all versions of the invention, the wall adjacent to a rotating control or mechanism provided to manually advance the film and cock the camera shutter is longer than the camera along the line of actuation of the rotational control or slide mechanism and a pressure compensation source softly inflates the container to enhance film winding functions as well as permitting operations of the camera at depth.

Figure 17:
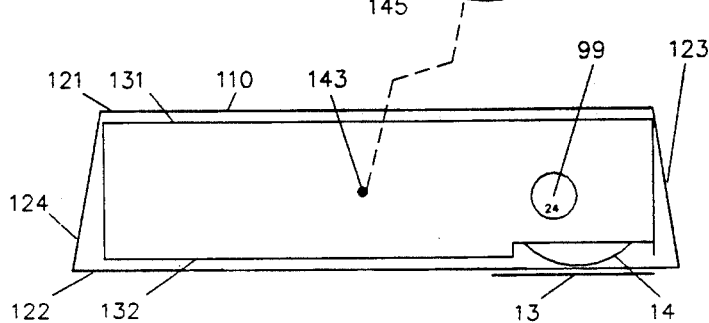
FIG. 17 is a top view of a merchandizing bag container for a single-use camera adapted to function as a waterproof housing according to the teachings of this invention, including the use of a special purpose balloon adaptation for pressure compensating the merchandizing bag container.

The top view, FIG. 17, of the housing graphically illustrates the relationships of the package or housing walls and the contained camera. The container or housing may be a simple rectangular structure longer than the camera in the dimension along the line of movement of the film winding wheel and adjacent thereto, but in a preferred embodiment, the front wall 121 is shorter than the rear wall 122. The front 121 of the housing is slightly larger than the front 131 of the camera. This results in the camera lens, flash and front view finder being held relatively stationary with respect to the front of the housing to prevent scratching of the optical areas in the front wall 121 of the housing when the housing is manipulated to wind the film. The rear wall 122 is longer than the camera back 132 by a length derived from the exposed arc of the film advance wheel 14. If the rear wall 122 is longer than the camera back by a length equal to the exposed arc of wheel 14, moving the rear wall relative to the camera back from one extreme to the other will result in a maximum rotational increment of wheel 14, provided the wall is frictionally engaged. The differential length between the rear wall and camera back defines the minimum length of the reinforcement pad 13 when the use of such a device is dictated by the material of the housing.

The side walls 123 and 124 are dimensioned to hold the front wall 121 parallel to the back wall 123 when a camera is in the housing and the camera front is in close proximity with the front wall while the rear wall is against the camera back. In FIG. 17 the side walls 123 and 124 are depicted as being of equal length but this is an expedient to simplify the illustration and not a requirement. For instance, one side wall may be shorter than the other and dimensioned to form simultaneous right angles with the front and rear walls. In this case, the length of the longer side wall may be calculated as the solution of a right triangle, i.e. "the length of the longer side wall equals the square root of the sum of the square of the length of the shorter side wall and the square of the difference in length between the front and rear walls". The dimensions of the top and bottom of the housing are trapezoidal and dictated by the dimensions of the walls.

One or more of the walls may be ridged but the walls and top and bottom must be flexibly joined to create a pressure housing and permit the required relative movement between the camera and housing wall.

The camera container bag adapted to serve as a pressure compensated underwater housing 110 may be high clarity plastic or similar material. Instructions and other indicia 141 may be printed on areas of the bag as long as an open window 86 remains over the camera lens on the front of the case as illustrated in FIG. 18.

Figure 18:
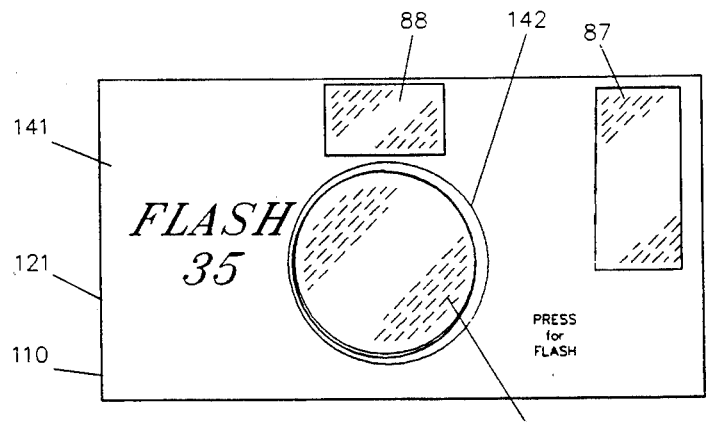
FIG. 18 is a front view of a merchandizing bag container for a single-use camera modified to incorporate indicae and windows according to the concepts of the present invention.
Figure 19:
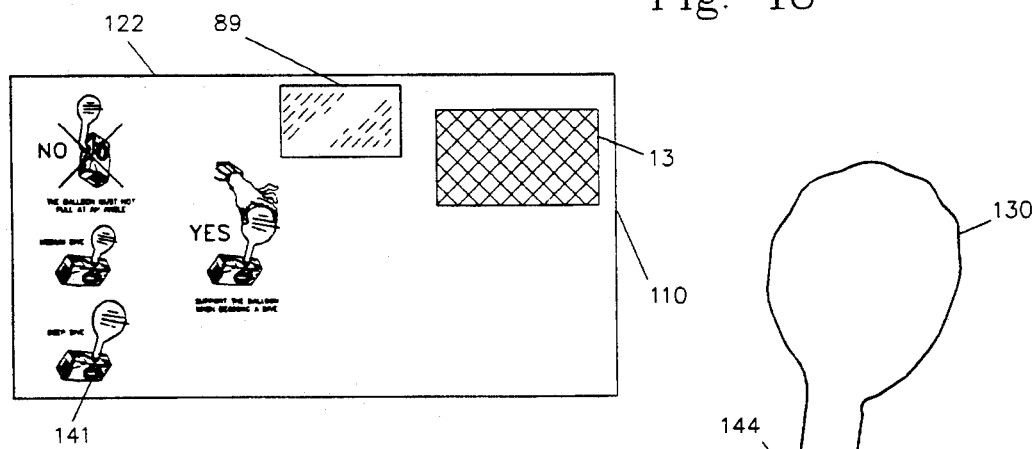
FIG. 19 is a rear view of a merchandizing bag container for a single-use camera modified to incorporate indicae, windows and a reinforcing pad according to the concepts of the present invention.

In FIGS. 18 and 19 the bag 110 is coated with a metalized coating in all areas except the window areas to prevent radiation, such as might be generated in a security X-ray machine, from fogging the film. In this embodiment, the front of the housing, FIG. 18, includes an optical window 86 for the camera lens, a flash window 87, and a view finder window 88. The back wall 121 of the housing, FIG. 19, incorporates a window means 89 for viewing an object and aiming the camera. An additional clear patch 99 is provided on the top of the housing, FIG. 17, over the camera film count indicator. In this embodiment, as in other embodiments, the flexible material of the bag may be heavy enough so that a reinforcing patch 13 is not required over the film advancing ratchet wheel but it can be incorporated either inside the housing or outside as needed.

Metalized patches may be placed over the clear windows to provide a complete radiation barrier for the film within the container housing 110. In these instances, care must be taken to avoid placing adhesives over the windows, especially the lens opening 86, to ensure that foreign material will not adhere to the openings when the cover patches are removed. A preferred approach is to place a bead of adhesive 142 around the window as illustrated in FIG. 18 so that a radiation barrier patch can be secured over the window without the risk of a tacky film remaining after the patch is removed.

In the packaging embodiment, the container bag 110 includes a hole 143 of FIG. 17 which may be weakened area that is ruptured by the user or an aperture covered by sealing tape. When the camera is to be used in an underwater environment, a balloon 130 is provided as a pressure compensation means. The balloon includes a mounting flange 144 secured to the balloon mouth opening. This embodiment is used by opening the hole 143 on the top of the housing 110 by puncturing the bag or removing a sealing means over a preformed aperture and stripping a protective cover 145 from a pressure sensitive adhesive film on the underside of flange 144 and pressing the flange against the bag 110 so that the mouth of the balloon covers the opening 143. Before the protective cover 145 is removed from the pressure sensitive adhesive on the mounting flange 144, the balloon is blown up to meet the depth requirements as previously described in this patent and the neck of the balloon twisted to prevent air from escaping while the protective cover 145 is removed and the mounting flange 144 sealed to the top of the housing.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. An underwater camera system, comprising:
   a container means for providing a waterproof environment for a camera;
   means for operating a manual film winding apparatus on said camera from outside said container via frictional engagement of said manual film winding apparatus with said container, said operating means comprising a wall section of said container adjacent to said manual film winding apparatus on said camera which is longer than said camera in the direction of activation of said film winding apparatus; and
   a variable volume gas reservoir for supplying pressure compensating gas to said container and accepting gas from said container as said container is varied in volume by manipulation to move said wall section relative to said camera for operation of said manual film winding apparatus.

2. An underwater camera system as defined in claim 1, wherein said reservoir is fabricated from a material which stretches to increase its volume.

3. An underwater camera system as defined in claim 2, comprising:
   indica on the exterior surface of said reservoir which stretches with said reservoir for indicating the operational depth of said system as a function of the volume of gas within said reservoir.

4. An underwater camera system as defined in claim 1, wherein said container is a merchandising protective container including window means.

5. An underwater camera system as defined in claim 4, wherein said reservoir is fabricated from a material which stretches to increase its volume.

6. An underwater camera system as defined in claim 5, comprising: indica on the exterior surface of said reservoir which stretches with said reservoir for indicating the operational depth of said system as a function of the volume of gas within said reservoir.

7. An underwater camera system, comprising: a bag fabricated from a flexible waterproof material with an open end dimensioned to permit passage of a camera into said bag;
   means for establishing an axis adjacent to said open end about which said bag may be rolled to form a roll seal of said open end;
   said means for establishing an axis including end extensions dimensioned to protrude beyond the respective ends of said roll seal; and
   means for mechanically interconnecting said end extensions after said roll seal is created for preventing said roll seal from unrolling.

8. An underwater camera system as defined in claim 7, wherein said flexible waterproof material is a high clarity plastic of a thickness within the range of 1 to 4 mils.

9. An underwater camera system as defined in claim 7, wherein said means for preventing said roll seal from unrolling further comprises tab means secured at the edges of said bag at the roll seal axis for forming said mechanical link between said edges for engaging a side of said bag to thereby prevent said axis from rotating relative to said bag.

10. An underwater camera system as defined in claim 7, wherein said means for preventing said roll seal from unrolling comprises a bar secured adjacent to said roll seal axis by said end extensions.

11. An underwater camera system as defined in claim 7, wherein said flexible waterproof material is a high clarity plastic 2.5 mils thick.

12. An underwater camera system as defined in claim 7, wherein said means for establishing an axis adjacent to said open end comprises a malleable wire secured to said bag along said axis line, said malleable wire being longer than the length of the open end of said bag and positioned to extend as said end extensions from the edges of said bag, said "end extensions" having a combined length which is greater than the length of said bag along said axis.

13. An underwater camera system as defined in claim 7, wherein said means for establishing an axis adjacent to said open end comprises a malleable wire secured to said bag, said malleable wire being longer than the length of said open end of said bag and positioned to extend as "said end extensions" from the edges of said bag. further comprising;
    means for joining said "end extensions", comprising an elongated member greater in length than said bag along said axis.

14. An underwater camera system as defined in claim 13, wherein said elongated member includes two holes spaced apart by a distance which will permit each of said "end extensions" to be secured to said member by passing through a different one of said holes in a mutually exclusive manner.

15. A package for a camera preloaded with film and including a manual film advance and shutter cocking means, comprising:
    a wrapping of flexible waterproof material forming a sealed container enclosing said camera;
    means for operating said manual film advancing and shutter cocking means through an adjacent wall section of said wrapping comprising a space within said wrapping formed by said wall section having a length in the direction of activation of said manual film advancing and shutter cocking means which is longer than said camera by a length approximately equal to the throw of said manual film advancing and shutter cocking means; and
    a variable volume gas reservoir for supplying pressure compensating gas to said container and accepting gas from said container as said container is varied in volume by moving said camera in and out of said space.

16. A package as defined in claim 15 wherein said adjacent wall section comprises means for alternately frictionally engaging and releasing said manual film advancing and shutter cocking means synchronously as said camera is slid in and out of said space.

17. A package as defined in claim 15, wherein said reservoir is fabricated from a material which stretches to increase its volume.

18. A package as defined in claim 17, comprising: indica on the exterior surface of said reservoir which stretches with said reservoir for indicating the operational depth of said system as a function of the volume of gas within said reservoir.

19. A package as defined in claim 15, wherein said flexible waterproof material is a high clarity plastic film.

20. A package as defined in claim 19, wherein said high clarity plastic film includes areas rendered opaque and bearing indicae and clear window areas.

21. A package as defined in claim 20, wherein said clear window areas include an optical port for the camera lens, windows on opposite sides of the camera view finder, a window in front of an integral camera flash lamp, and a viewing port over a film frame counter.

22. A package as defined in claim 21, comprising a reinforcing patch of flexible material secured to said adjacent wall over said manual film advancing and shutter cocking means.

23. A package as defined in claim 17 wherein said reservoir is a balloon including means for sealing the mouth of said balloon over a hole in said container.

24. A package for a camera preloaded with film and including a manual film advance and shutter cocking means, comprising:
    a pliable plastic film bag including means for sealing said camera therein;
    means for operating said manual film advancing and shutter cocking means through the wall of said bag comprising a space within said bag formed by said bag having a length in the direction of activation of said manual film advancing and shutter cocking means which is longer than said camera by approximately the throw length of said manual film advancing and shutter cocking means; and
    a variable volume gas reservoir for supplying pressure compensating gas to said bag and accepting gas from said bag as said bag is varied in volume by moving said camera in and out of said space.

25. A package as defined in claim 24 wherein said wall section comprises means for alternately frictionally engaging and releasing said manual film advancing and shutter cocking means synchronously as said camera is slid in and out of said space.

26. A package as defined in claim 24, wherein said reservoir is fabricated from a material which stretches to increase its volume.

27. A package as defined in claim 26, comprising: indica on the exterior surface of said reservoir which stretches with said reservoir for indicating the operational depth of said system as a function of the volume of gas within said reservoir.

28. A package as defined in claim 26 wherein said reservoir is a balloon including means for sealing the mouth of said balloon over a hole in said bag.

29. A package as defined in claim 24, wherein said plastic film is a high clarity plastic film.

30. A package as defined in claim 29, wherein said high clarity plastic film includes areas rendered opaque and bearing indicae and clear window areas.

31. A package as defined in claim 30, wherein said clear window areas include an optical port for the camera lens, windows on opposite sides of the camera view finder, a window in front of an integral camera flash lamp, and a viewing port over a film frame counter.

32. A package as defined in claim 31, comprising a reinforcing patch of flexible material secured to said bag wall over said manual film advancing and shutter cocking means.

33. A method of operating a camera in an underwater environment, including the steps of:
    sealing said camera in a waterproof pressure container fabricated from a pliable material dimensioned larger than said camera along an axis in line with the throw of a manual control to be operated;
    pneumatically coupling a compensation gas source reservoir to said container;
    adjusting the contents of said reservoir so that said container is softly inflated at the desired operational depth; and
    operating manual controls of said camera by synchronously applying and removing frictional pressure to said controls through said container by squeezing and releasing said container against said control to alternately force pressure compensating gas from said container into said compensation gas source reservoir and from said compensation gas source reservoir into said container while forcing said camera in and out of a space within said container created by the length of said container in excess of the dimensions of said camera and the pressure within the container created by gas from said reservoir.

34. An apparatus, comprising:
    a flexible, pressure compensated bag-like housing larger than its contents;
    means for maintaining a slight positive pressure within said housing for permitting the contents to be moved relative to at least one wall of said housing to activate said manual controls by selective frictional engagement between said wall and control during said relative movement; and said means including means for accepting pressure compensating gas from said housing when said housing is manipulated during activation of said manual controls and supplying pressure compensating gas to said housing during a second manipulation of said housing required to accomplish the activation of manual controls.

35. An apparatus as defined in claim 34 wherein said means for maintaining a slight positive pressure within said housing comprises a variable volume gas reservoir for supplying pressure compensating gas to said housing and accepting gas from said housing as said housing is varied in volume by manipulation to move said contents relative to said wall.

36. An apparatus as defined in claim 35 wherein said housing is a merchandising container for the contents.

37. An underwater camera system as defined in claim 34, wherein said container is a bag fabricated from a flexible waterproof material with an open end dimensioned to permit passage of a camera into said bag, further comprising:

means for establishing an axis adjacent to said open end about which said bag may be rolled to form a roll seal of said pen end;

said means for establishing an axis including end extensions dimensioned to protrude beyond the respective ends of said roll seal; and means for mechanically interconnecting said end extensions after said roll seal is created for preventing said roll seal from unrolling.

* * * * *